Figure 1:
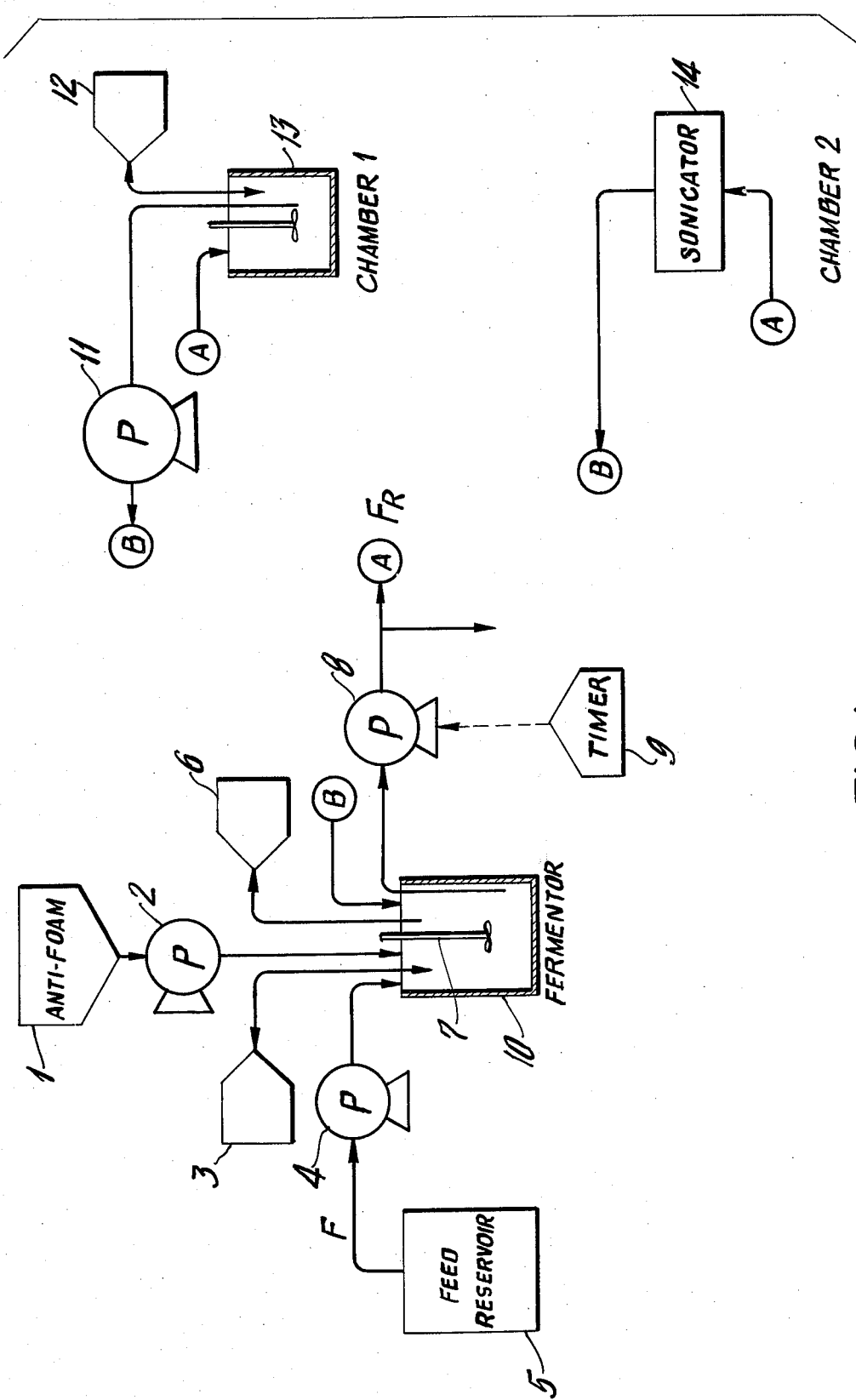

United States Patent [19]
Young et al.

[11] 3,886,046
[45] May 27, 1975

[54] RECYCLE FERMENTATION PROCESS

[75] Inventors: Thomas Benton Young, Lambertville, N.J.; H. Michael Koplove, Watertown, Mass.

[73] Assignee: E. R. Squibb & Sons, Inc., Princeton, N.J.

[22] Filed: June 28, 1973

[21] Appl. No.: 374,721

[52] U.S. Cl. ............. 195/115; 195/36 P; 195/80 T; 195/81
[51] Int. Cl. ......................... C12b 1/00; C12d 9/00
[58] Field of Search ...... 195/115, 104, 108, 1, 80 T, 195/81, 36 P

[56] References Cited
UNITED STATES PATENTS

| | | | |
|---|---|---|---|
| 2,609,327 | 9/1952 | Kolachov et al. | 195/115 |
| 3,062,724 | 11/1962 | Reusser | 195/115 |
| 3,591,455 | 7/1971 | Oppermann | 195/115 |

*Primary Examiner*—Alvin E. Tanenholtz
*Attorney, Agent, or Firm*—Lawrence S. Levinson; Merle J. Smith; Stephen B. Davis

[57] ABSTRACT

A fermentation process is disclosed which comprises destroying or partially destroying the fermenting cells and utilizing said cells as nutrients by recycling in the presence of the desired fermentation product.

10 Claims, 3 Drawing Figures

RECYCLE FERMENTATION PROCESS

There is a constantly increasing market for fermentation products, especially in the pharmaceutical and food areas. However, the cost of production of these materials is relatively high. In addition, as the production of these materials increases, problems have been encountered in disposing of the spent fermentation materials. A very considerable research effort has been undertaken to maximize production rates, reduce costs and minimize environmental pollution, especially in the pharmaceutical industry which utilizes fermentation processes extensively for the production of antibiotics and other biologically active agents. Generally, antibiotics are prepared in batch processes. At harvest the antibiotics are separated from the microbial broths. The spent broth material is generally not reused, but rather, is disposed of as a waste effluent. Some attempts at reuse of microbial cellular material have been reported; in these cases the material was separated from product, treated and introduced as a discrete addition into a subsequent batch fermentation in the initial batch charge.

This invention relates to the continuous removal of broth from a fermentor, followed by a partial or complete destruction of cellular viability in the presence of antibiotic without a separation step wherein the antibiotic is removed from the broth, and by the continuous reintroduction of the resultant treated broth containing antibiotic and non-viable cellular material into the fermentor during the same on-going fermentation. In addition, this invention relates to the use of continuous microbial cell destruction and recycle, wherein a separation of antibiotic occurs in the recycling stream. Furthermore, this invention relates to a continuous or semicontinuous fermentation incorporating the said recycle stream. Finally, this invention relates to the intentional destruction of cells directly within the fermentor at peak times during the fermentation process.

While the preferred use of this process is directed to the preparation of antibiotics, especially penicillin, nystatin, tetracycline and amphotericin, this invention is also intended to encompass other useful fermentations such as the production of amino acids and vitamins, especially B12, and the production and transformation of steroids, especially triamcinoline.

The invention will be described in connection with the accompanying figures:

Referring to FIG. 1. The fermentor 10, which is fitted with a means for agitating 7 supplied from the feed reservoir 5 by a pump 4. In addition, an antifoamer is introduced from a storage area 1 by a pump 2. The pH of the fermentor is monitored and controlled by a meter and regulator 3. Dissolved oxygen content is monitored by a probe and meter 6. Material is pumped out of the fermentor 10 by an exit pump 8 coupled to a timer 9 to a destruction chamber 13 or 14. Destruction chamber 1 is monitored by a pH meter and regulator 12 and the material returned to the fermentor 10 by way of a recycling pump 11.

Figure 2:
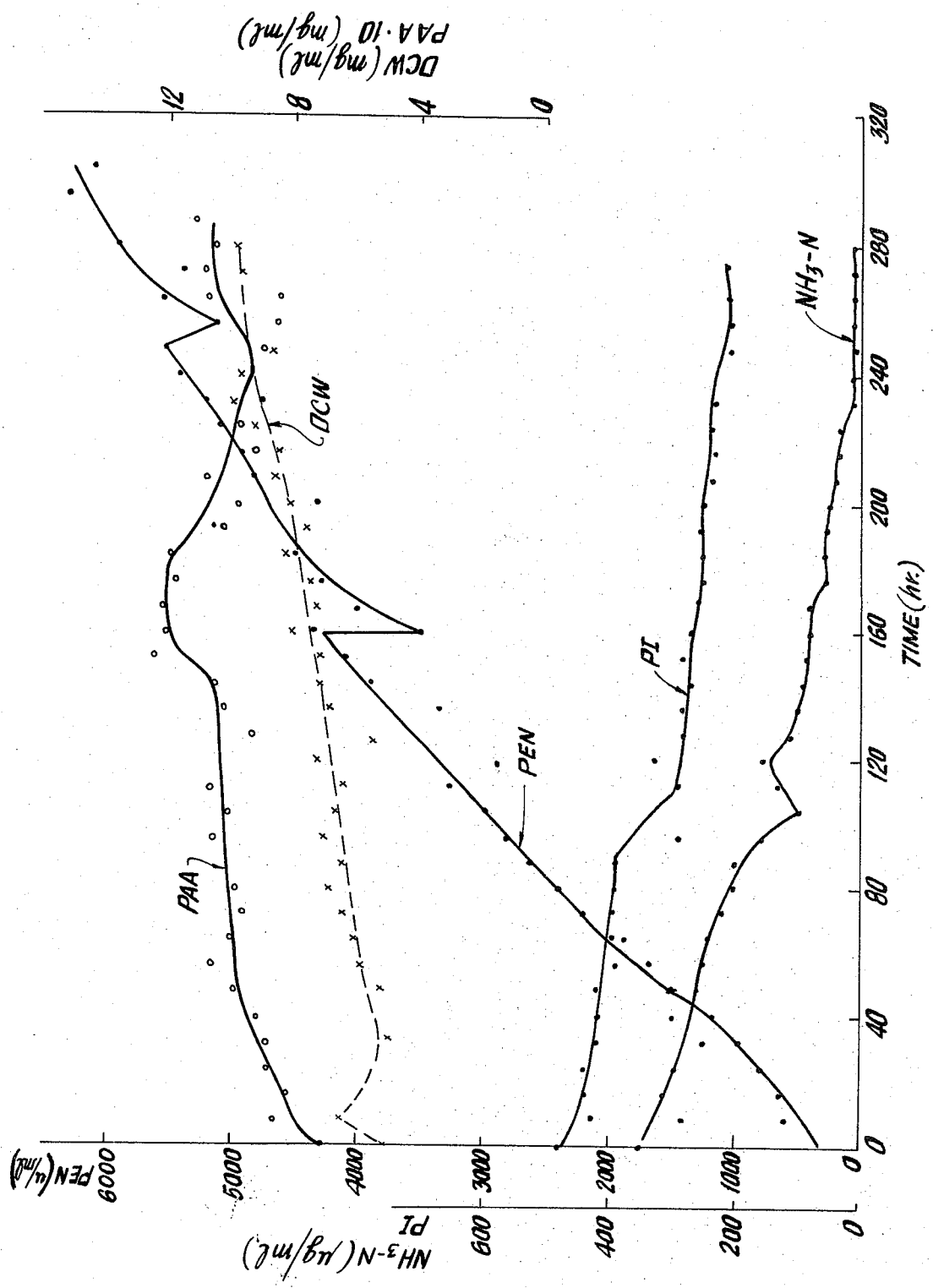
Figure 3:
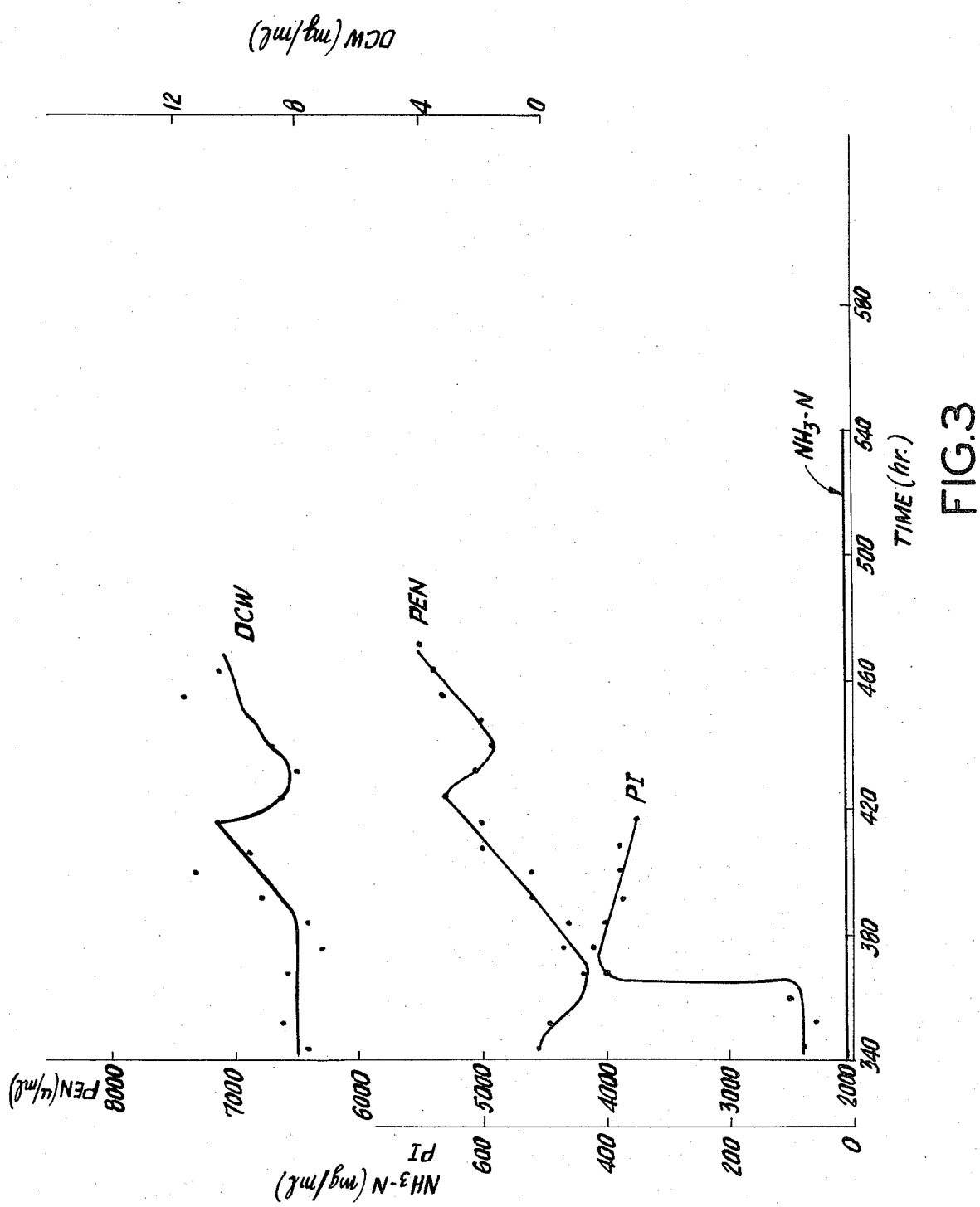

FIGS. 2 and 3 are graphes wherein penicillin concentration PEN, dry cell weight concentration DCW, inorganic soluble phosphate concentration PI and ammonia nitrogen concentration $NH_3$—N are plotted against time using an ultrasonic and a high shear field destruction chamber.

The advantages of the process of this invention over those now generally employed in the area of antibiotic fermentation are several fold. The fermentation can be conducted, such that cellular growth can be controlled at a desired specific growth rate without the large volumetric throughput of a one stage single pass continuous fermentation. Thereby, recovery of product involves a smaller broth volume, more concentrated in product content, as opposed to a larger broth volume, more dilute in product content. There is an economy of raw material usage in that the carbon energy, nitrogen and minerals contained in cellular material are recycled, rather than used in a single pass. There is an economy in waste treatment cost in that the volume of spent material is reduced considerably. There is an economy in that the fermentation period can be extended thus reducing the down time fraction of the total batch cycle and increasing the fermentor productivity on an annual basis.

The process of this invention requires cell destruction by methods which would not cause product decomposition in the case where no separation of antibiotic would occur in the recycling stream. Thus, the cellular viability may be destroyed by controlled ultrasonics, ultraviolet light, pH change, temperature change, nutrient starvation, homogenization, and high shearfield, wherein the preferred method of destruction is high shearfield. If the destruction is to be carried out in situ, a high shearfield technique appears most suitable.

In the following description and examples of this invention, the symbols used are defined below:

$V$ = fermentor volume, ML
$X$ = viable cell mass concentration MG/ML
$\mu$ = specific growth rate, $HR^{-1}$
$F$ = feed/withdrawal flow rates, ML/HR
$F_R$ = recycle flow rate, ML/HR
$K$ = kill fraction
$D = F/V$ = dilution rate, $HR^{-1}$
$D = F/V$ = dilution rate, $HR^{-1}$
$K_D = F_R K/V$ = specific rate of destruction, $HR^{-1}$ Since it is desired to maintain a certain specific rate, it is necessary to destroy cells in the recycle at such a rate as to equal the growth rate. This can be achieved by presetting the destruction rate so as to destroy in one hour the number of cells produced in the fermentor in a one-hour period. For any system, the calculations can be easily made to determine the flow rate by the following formula:

$$F_R = \frac{(\mu - D) V}{K}$$

Thus an aerated and well agitated fermentation vessel is batched with suitable medium, sterilized, cooled to a desired temperature, and inoculated with a seed culture of the desired microorganism. Growth of cells is allowed until such time as nutrients in the initial charge are depleted. Sterile nutrient feed or feeds are then begun. When the cell mass concentration has reached a desired level, a fermentation broth is continuously aseptically removed from the fermentator and pumped through a cell destruction stage, in which cells are rendered partially or totally non-viable, and then returned to the fermentor.

A steady-state condition is achieved in which (a) cell specific growth rate and cell mass concentration in the fermentor are maintained at a desired level and (b)

product is continuously produced in higher concentration. The degree of product concentration can be determined by the relative values of specific growth rate and the dilution rate employed.

If $\mu >> D$, i.e., the fermentor is fed with a low volume concentrated nutrient feed, the recycle flow rate is approximated by the formula $$F_R = \frac{\mu V}{K}$$

and the product concentration is maximum. If the dilution rate due to nutrient feeds is significant, a broth harvest line is superimposed on the fermentor to allow maintaining a controlled reacting volume via periodic permanent removal of broth from the fermentor. In this case, a continuous process consisting of a continuous nutrient feed, continuous destruction and recycle of cells and periodic removal of broth from the fermentor for recovery of concentrated product is achieved.

EXAMPLE 1

The production of potassium pencillin G by a strain of *penicillin chrysogenum*.

PROCEDURE

An 8-liter working volume stirred jar fermentor is arranged as in shown in FIG. 1. The fermentor is batched with medium as described in Table I and is sterilized at 121°C for 1 hour in an autoclave. The fermentor temperature is cooled to 25°C and maintained at that temperature by automatic temperature control. The medium pH is then adjusted to 7.0 and maintained at that pH by automatic addition of 10 percent (v/v) aqueous NaOH solution (using one-way on-off control). Aeration at 0.5 VVM and agitation at 600–800 RPM is begun and allowed to saturate the medium with dissolved oxygen. A dissolved oxygen probe is calibrated setting 100 percent equal to saturated medium at 25°C and atmospheric pressure. Dissolved oxygen level is maintained in excess of 50 percent by increasing aeration and/or agitation as required.

When pH, temperature, and dissolved oxygen concentration have been set, the fermentor is inoculated with 100 ml of mold culture previously grown at 25°C in the same medium in a shaken flask. The fermentation is allowed to proceed as a simple batch process for 24 hours after which the solution described in Table II is fed at 13 ml/hr. Simultaneously, whole broth is aseptically removed from the fermentor at 133 ml/hr. A sample of 13 ml/hour is removed and the remaining 120 ml/hour of broth is pumped into a 4-liter nonaerated vessel.

Mycelial broth is maintained in the destruction vessel at high shear and under nutrient starvation for a mean residence time of 33 hours and then returned to the 8-liter fermentor in a continuous recycle stream. Product is concentrated for 300 hours in this manner as shown in FIG. 2 while the viable cell mass concentration is maintained constant. A buildup of total cell mass concentration is observed due to imcomplete reutilization of destroyed cells in the 8-liter fermentor.

EXAMPLE 2

The production of potassium pencillin G by a strain of *penicillin chrysogenum*.

PROCEDURE

A procedure identical to Example 1 is followed with the exception that a continuous flow ultrasonic cell disruptor is used in place of the 4-liter destruction vessel. Again, broth is removed continuously from the 8-liter fermentor at 120 ml/hr and pumped aseptically through an ultrasonic flow cell (20 KH2) wherein temperature is maintained at 10°C by cooling water jacket. Potassium penicillin G is concentrated while viable cell mass is maintained constant as shown in FIG. 3.

EXAMPLE 3

The production of nystatin by *Streptomyces noursei*. A recycle stream is designed as follows:

$$F_R = \frac{(\mu - D)}{K} V$$
$\mu = 0.03$ HR$^{-1}$
$V = 50,000$ liters
$K = 0.5$
$D = .006$ HR$^{-1}$
$$F_R = \frac{(0.03 - .006)}{0.5} 50,000$$
$$F_R = \frac{.024}{.5} 50,000$$
$$F_R = 2,400 \text{ L/HR}$$

Table I

| Batching Media | |
|---|---|
| Sucrose (liquid, 67% w/w) | |
| a. Series A experiments | 240 g |
| b. Series B experiments | 120 g |
| Phenylacetic Acid (liquid, 50% w/w) | 8 g |
| Sodium Phosphate (di-hydrogen) | 24 g |
| Amonium Sulfate | 41.5 g |
| Trace Metals | |
| a. MgSO$_4$.7H$_2$O | 2 g |
| b. FeSO$_4$.7H$_2$O | 1 g |

The above was batched to eight liters in the stir jars with tap water.

TABLE II

| FEED SOLUTION | |
|---|---|
| Sucrose | 3800 gms |
| Ammonium Sulfate | 176 gms |
| Phenyl Acetic Acid | 350 gms |

Batched to 16 liters with tap water and sterilized for 1 hour in an autoclave at 121°C.

What is claimed is:

1. A fermentation process which comprises growing microorganisms that produce a useful product in an aerated nutrient medium in an agitated fermentor, continuously and aseptically removing at a predetermined rate broth containing microorganisms and product from said fermentor after the microorganism mass concentration in said fermentor has reached a desired level, destroying the viability of part or all of the microorganisms in said broth in the presence of said useful product under conditions which are not destructive to said product, and continuously recycling said broth containing product and partially or totally non-viable microorganisms to said fermentor such that the specific rate of destruction of microorganisms in said broth is equal to the specific growth rate less the dilution rate of microorganisms in the fermentor.

2. The process of claim 1 wherein the product is an antibiotic.

3. The process of claim 1 wherein the product is selected from the group consisting of penicillin, nystatin, and tetracycline.

4. The process of claim 1 wherein said product is removed from the recycling broth prior to destruction of the viability of all or part of the microorganisms.

5. The process of claim 1 wherein the fermentation process is a batch, fed-batch, semi-continuous, or continuous process.

6. The process of claim 1 wherein the means of destruction is selected from the group consisting of heat, homogenization, shearing, pH change, ultrasonic waves, or ultraviolet light.

7. The process of claim 4 wherein the product is an antibiotic.

8. The process of claim 4 wherein the fermentation process is a batch, fed-batch, semi-continuous, or continuous process.

9. The process of claim 4 wherein the product is selected from the group consisting of penicillin, nystatin and tetracycline.

10. The process of claim 4 wherein the means of destruction are selected from the group consisting of heat, homogenization, shearing, pH change, ultrasonic waves, or ultraviolet light.

* * * * *